United States Patent
Ducharme et al.

[11] Patent Number: 5,544,999
[45] Date of Patent: Aug. 13, 1996

[54] METHOD AND APPARATUS FOR STACKING MODULAR HOUSING UNITS

[75] Inventors: Troy E. Ducharme; Jeffrey A. Grusie, both of Calgary, Canada

[73] Assignee: Ducharme Oilfield Rentals Ltd., Calgary, Canada

[21] Appl. No.: 351,944

[22] Filed: Dec. 8, 1994

[51] Int. Cl.[6] .......................... B65G 57/03; B65G 67/24
[52] U.S. Cl. .................. 414/786; 108/55.1; 414/392; 414/395; 414/792.7; 414/572
[58] Field of Search ................... 414/786, 267, 414/390–392, 395, 396, 500, 572, 792.7; 298/8 R; 211/151; 248/146; 108/55.1, 55.5

[56] References Cited

U.S. PATENT DOCUMENTS

| | | | |
|---|---|---|---|
| 830,630 | 9/1906 | Webster | 414/392 |
| 840,189 | 1/1907 | Alvey | 414/267 |
| 1,870,991 | 8/1932 | Fitch | 414/392 X |
| 1,921,605 | 8/1933 | Canfield | 414/500 X |
| 1,933,211 | 10/1933 | Flowers | 414/500 X |
| 2,665,020 | 1/1954 | Whittle | 414/500 |
| 3,219,206 | 11/1965 | Cocker; III | 414/267 X |
| 3,473,674 | 10/1969 | Fau | 211/151 |
| 3,831,712 | 8/1974 | Neely et al. | 414/267 X |
| 3,891,288 | 6/1975 | Marquette | 211/151 |
| 4,065,022 | 12/1977 | Cainaud | 248/146 X |

*Primary Examiner*—David A. Bucci
*Attorney, Agent, or Firm*—Anthony R. Lambert

[57] ABSTRACT

A method for stacking trailers is described. Firstly, position a first trailer on a skid assembly having an upper support frame that overlies a top of the first trailer. The upper support frame has a first end and a second end. Secondly, secure a first end of a tow line to an end of a skid assembly for a second trailer. The tow line is extended over the upper support frame from the first end across to the second end and then a second end of the tow line is secured to a winch. Thirdly, activate the winch to raise the skid assembly of the second trailer to the height of upper support frame and then draw the skid assembly of the second trailer from the first end of the upper support frame across the upper support frame until the end of the skid assembly of the second trailer to which the tow line is attached is positioned at the second end of the upper support frame.

5 Claims, 5 Drawing Sheets

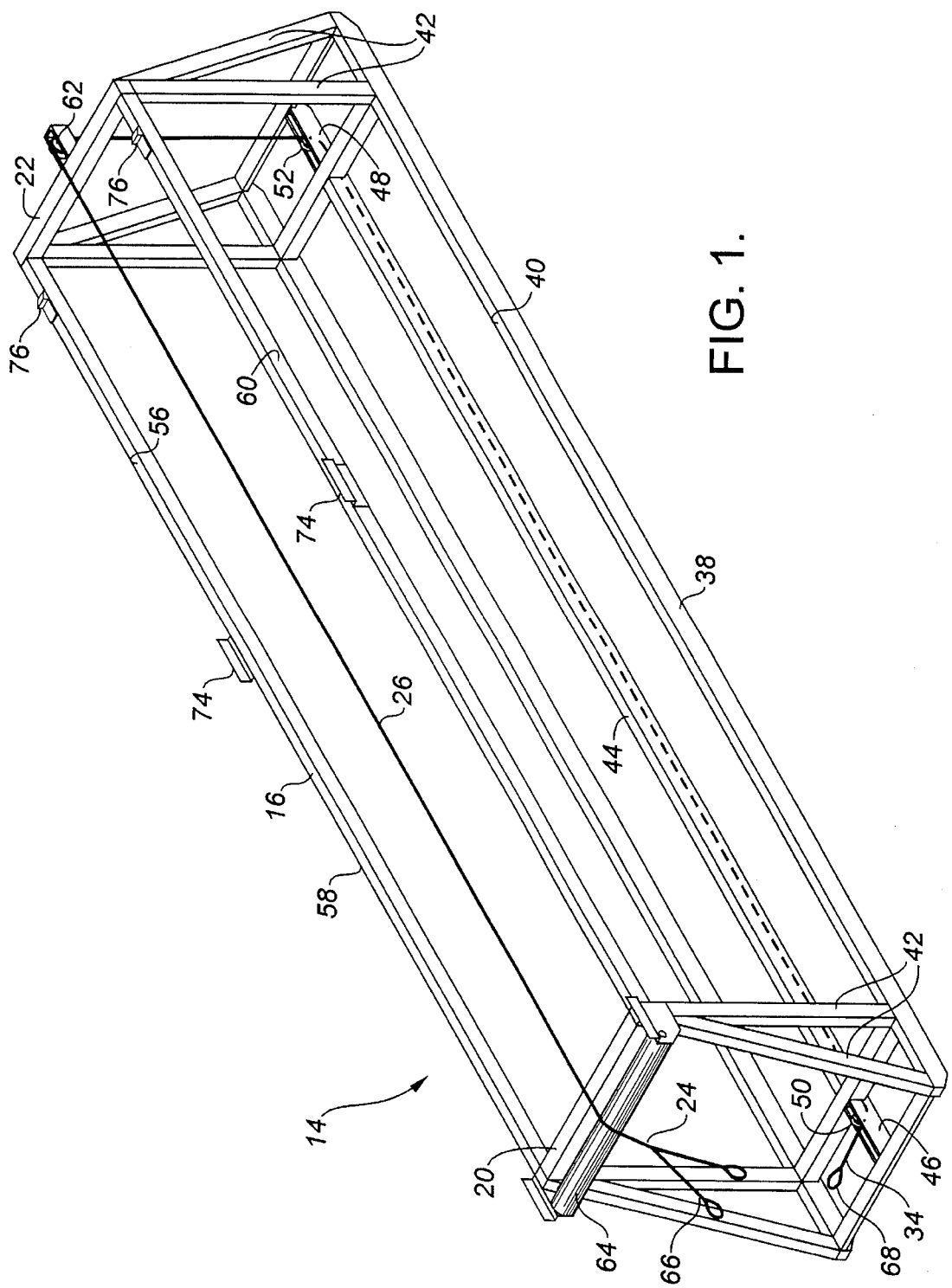

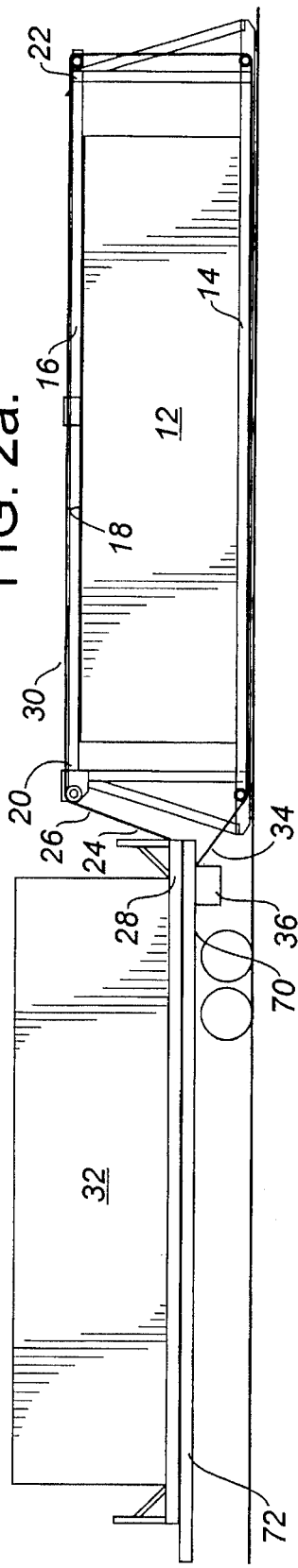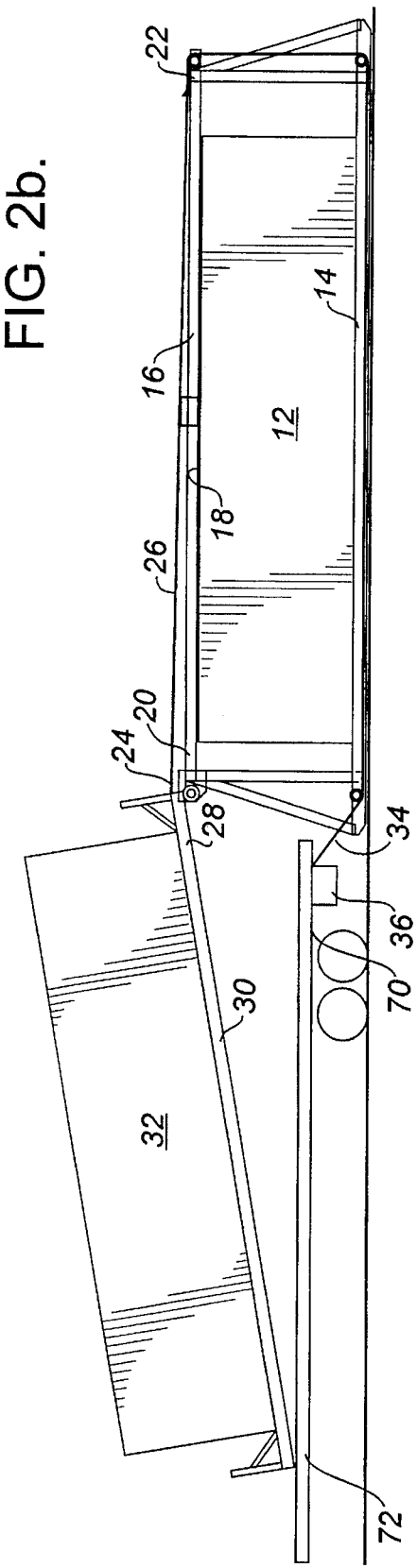

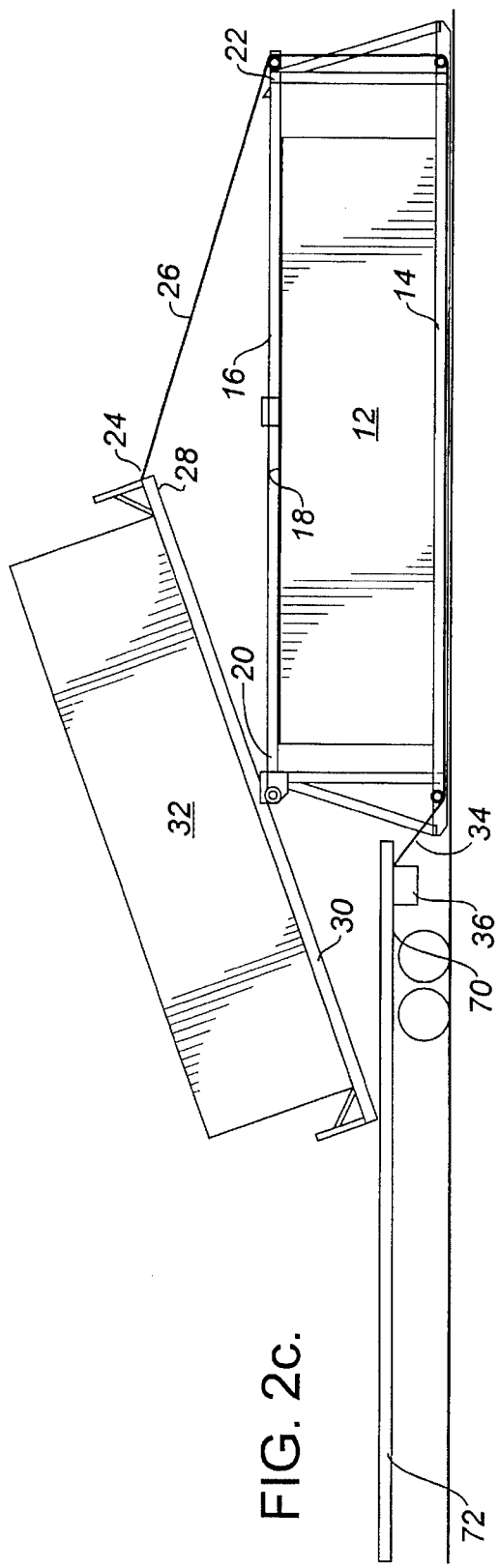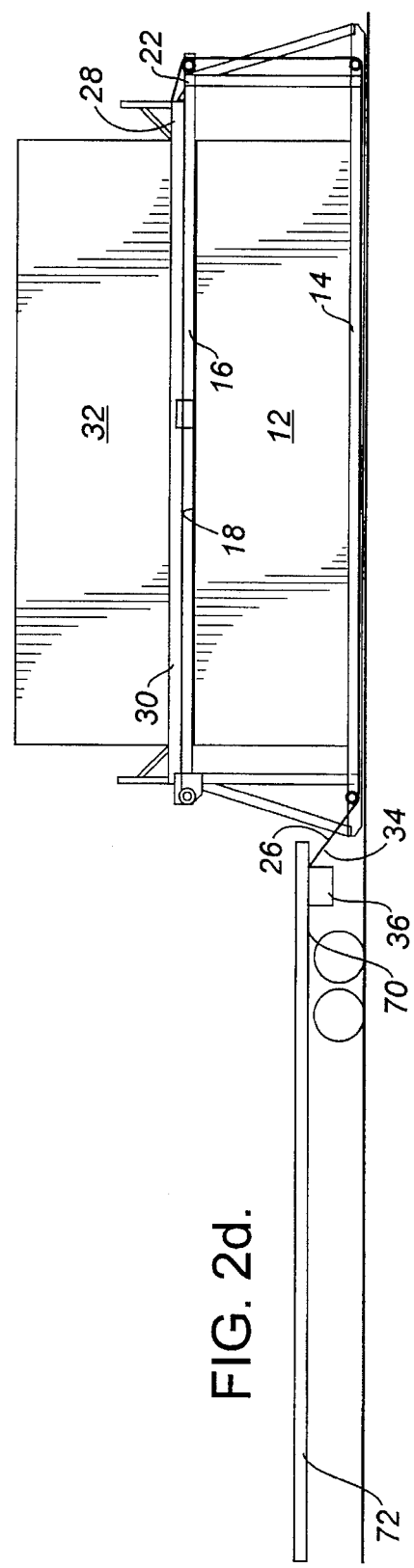

5,544,999

METHOD AND APPARATUS FOR STACKING MODULAR HOUSING UNITS

FIELD OF THE INVENTION

The present invention relates to a method and apparatus for stacking modular housing unit at oil or gas well drilling sites.

BACKGROUND OF THE INVENTION

In order to address both economic and environmental concerns oil and gas well drilling sites have decreased in size over recent years. This decrease in size is partially economic; to reduce the overall compensation that must be paid to a land owner dispossessed of a portion of his land as a result of the drilling activity. This decrease in size is partially environmental; to reduce the amount of land potentially exposed to contamination as a result of the drilling activity.

A space saving measure that has been adopted is to "stack" modular housing unit one on top of another. In order to do this two cranes must come to the drilling site. The cranes are positioned at each end of one of the modular housing unit and through a coordinated effort lift it onto another of the modular housing unit. However, to have two cranes travel to remote sites to perform this task is expensive.

SUMMARY OF THE INVENTION

What is required is an alternative method and associated apparatus for stacking modular housing unit.

According to one aspect of the present invention there is provided a method for stacking modular housing unit. Firstly, position a first modular housing unit on a skid assembly having an upper support frame that overlies a top of the first modular housing unit. The upper support frame has a first end and a second end. Secondly, secure a first end of a tow line to an end of a skid assembly for a second modular housing unit. The tow line is extended over the upper support frame from the first end across to the second end and then a second end of the tow line is secured to a winch. Thirdly, activate the winch to raise the skid assembly of the second modular housing unit to the height of upper support frame and then draw the skid assembly of the second modular housing unit from the first end of the upper support frame across the upper support frame until the end of the skid assembly of the second modular housing unit to which the tow line is attached is positioned at the second end of the upper support frame.

With the method, as described above, the second modular housing unit can be winched into position onto the upper support frame that overlies the first modular housing unit. There is no need to bring any additional equipment onto the drilling site, as a winch is common to such drilling sites. Once the method is understood, apparatus can be developed to make the application of the method easier.

According to another aspect of the present invention there is provided a skid assembly including a lower support frame having a top surface with a plurality of support members extending from the top surface. An upper support frame is supported by the support members in parallel spaced relation to the lower support frame. The upper support frame has a top surface, a first end, a second end and opposed sides. A rotatably mounted roller extends between the opposed sides at the first end of the upper support frame.

With the skid assembly, as described above, the presence of a roller at the first end makes it easier to use a winch to pull a second modular housing unit into position on top of the upper support frame. It will be appreciated that there are a number of alternative positions for the placement of the winch.

Although beneficial results may be obtained through the use of the skid assembly, as described above, the winching process can be further simplified by having direction altering roller assemblies and cable guides can be incorporated into skid assembly. Even more beneficial results may, therefore, be obtained when the lower support frame has a centrally positioned cable guide channel with a first roller assembly positioned at a first end, a second roller assembly positioned at a second end. A direction altering roller assembly is centrally mounted intermediate the opposed sides at the second end of the upper support frame, thereby providing a routing for a cable through the cable guide channel.

Although beneficial results may be obtained through the use of the skid assembly, as described above, difficulties may be encountered if the second modular housing unit begins to slide off to one side as it is being winched onto the upper support frame. Should this occur the drilling crew may not have equipment available to correct the problem. Even more beneficial results may, therefore, be obtained when guide means are secured to the opposed sides of the upper support frame. The guide means extend above the top surface of the upper support frame thereby guiding a skid mounted modular housing unit as it travels from the first end to the second end of the upper support frame.

Although beneficial results may be obtained through the use of the skid assembly, as described above, if the winch pulled the modular housing unit too far along the upper support frame there would be no means available to the drilling crew to move the trailer back toward the first end. Even more beneficial results may, therefore, be obtained when stop means are secured to the top surface of the upper support frame adjacent the second end. The stop means limit the extent to which a skid mounted modular housing unit can move along the top surface of the upper support member toward the second end.

BRIEF DESCRIPTION OF THE DRAWINGS

These and other features of the invention will become more apparent from the following description in which reference is made to the appended drawings, wherein:

FIG. 1 is a perspective view of a skid assembly constructed in accordance with the teachings of the present invention.

FIG. 2a is a side elevation view, being a first in a sequence of four illustrations, illustrating a method of stacking modular housing unit in accordance with the teachings of the present method.

FIG. 2b is a side elevation view, being a second in a sequence of four illustrations, illustrating a method of stacking modular housing unit in accordance with the teachings of the present method.

FIG. 2c is a side elevation view, being a third in a sequence of four illustrations, illustrating a method of stacking modular housing unit in accordance with the teachings of the present method.

FIG. 2d is a side elevation view, being a fourth in a sequence of four illustrations, illustrating a method of stacking modular housing unit in accordance with the teachings of the present method.

DETAILED DESCRIPTION OF THE PREFERRED EMBODIMENT

Figure 3:
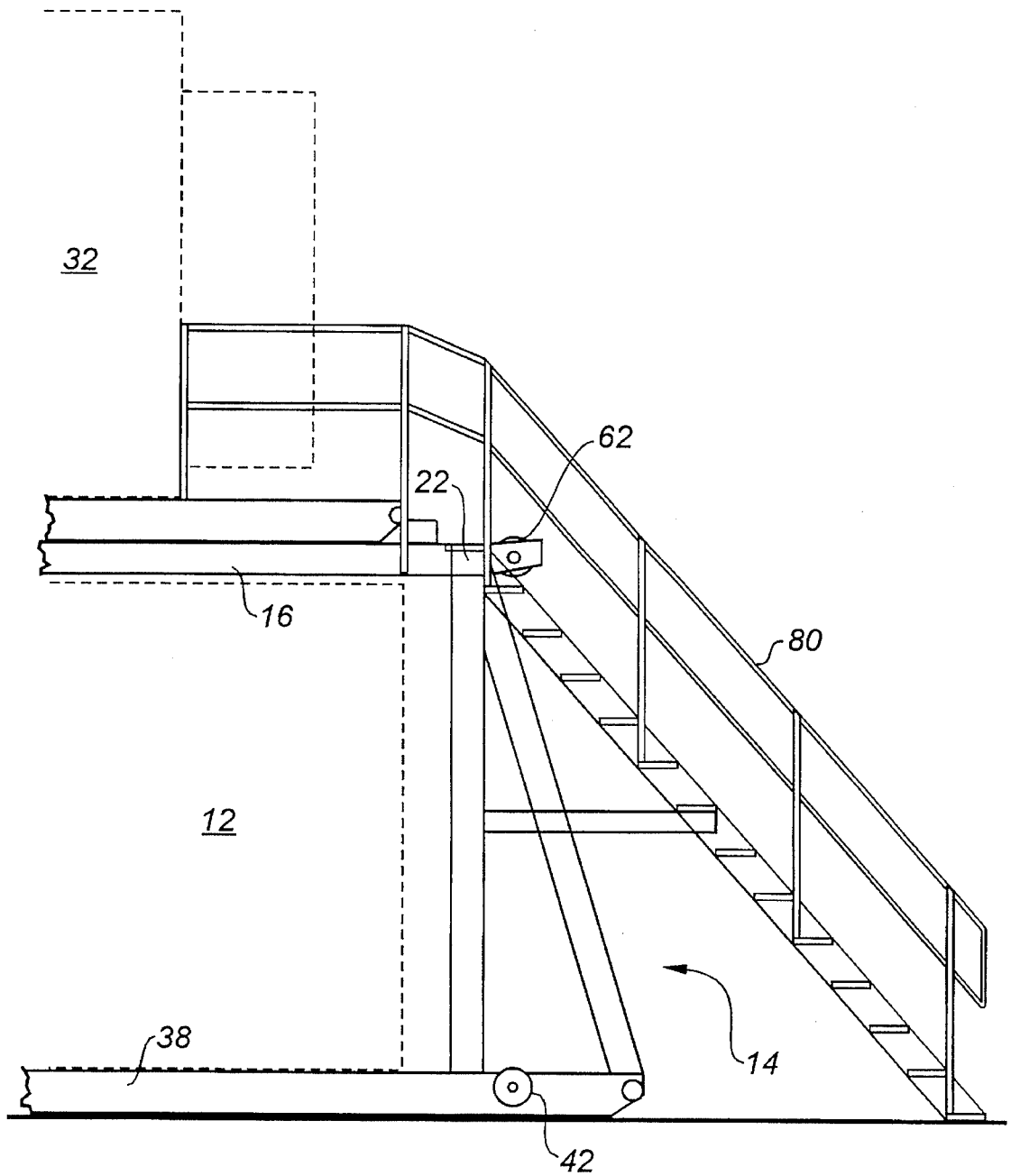
FIG. 3 is a detailed side elevation view of a portion of stacked modular housing unit illustrated in FIG. 2d.

The preferred method for stacking modular housing unit will now be described with reference to FIGS. 1 through 4.

In its most elementary form the method for stacking trailers involves the following described steps. Firstly, position a first modular housing unit 12 on a skid assembly 14 having an upper support frame 16 that overlies a top 18 of first modular housing unit 12, as illustrated in FIG. 2a. The best mode of skid assembly 14 is illustrated in FIG. 1, and will hereinafter be described in more detail. Referring to FIG. 2a, upper support frame 16 has a first end 20 and a second end 22. Secondly, secure a first end 24 of a tow line 26 to an end 28 of a skid assembly 30 for a second modular housing unit 32. Tow line 26 is extended over upper support frame 16 from first end 20 across to second end 22. A second end 34 of tow line 26 is secured to a winch 36. Thirdly, activate winch 36 to raise skid assembly 30 of second modular housing unit 32 to the height of upper support frame 16, as illustrated in FIG. 2b. Then draw skid assembly 30 of second trailer 32 from first end 20 of upper support frame 16 across upper support frame 16, as illustrated in FIG. 2c. This is continued until end 28 of skid assembly 30 of second modular housing unit 32 to which first end 24 of tow line 26 is attached is positioned at second end 22 of upper support frame 16, as illustrated in FIG. 2d.

Figure 4:
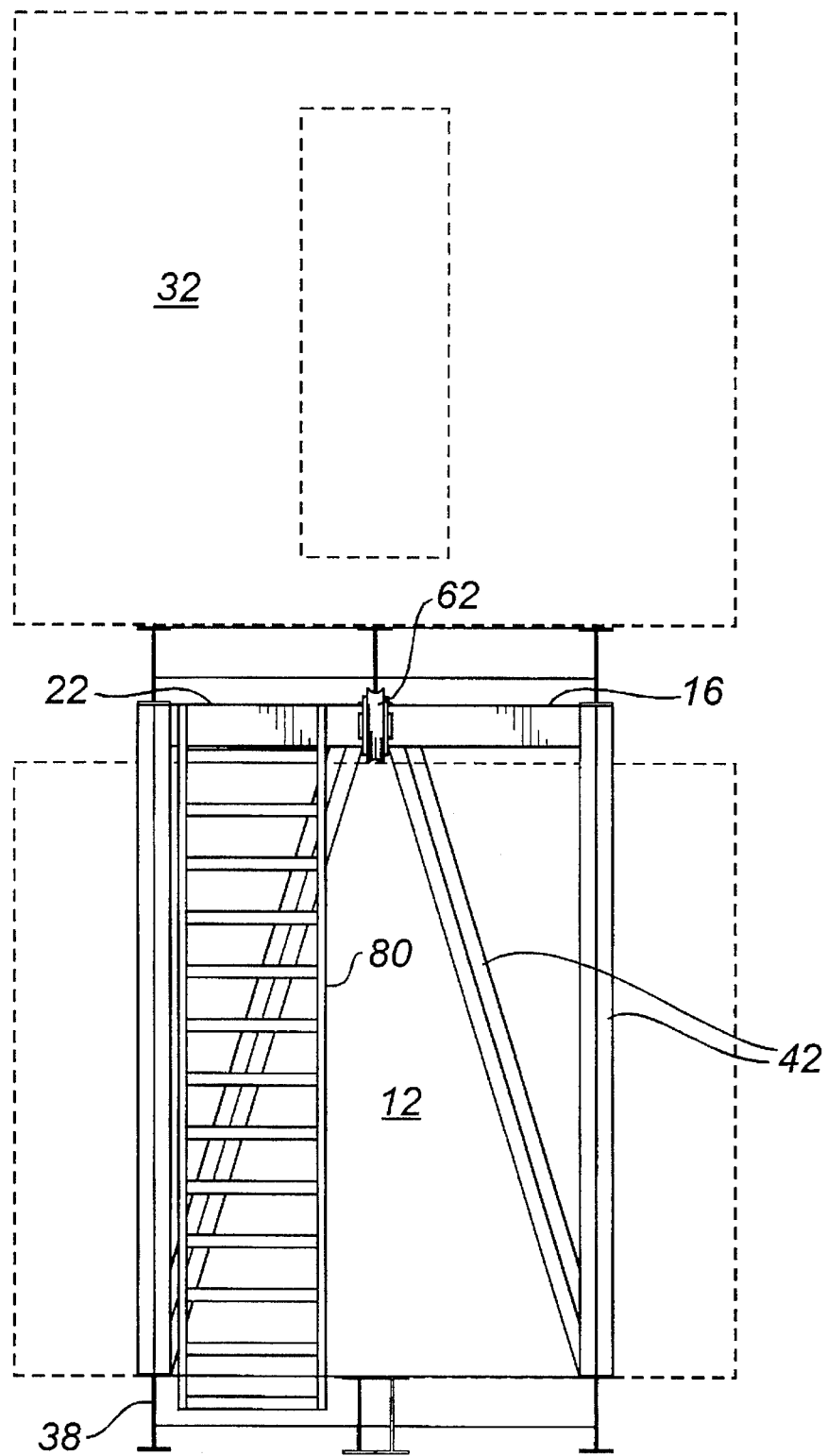
FIG. 4 is a detailed end elevation view of stacked modular housing unit illustrated in FIG. 2d.

Referring to FIG. 1, the best form of skid assembly 14 is illustrated. Skid assembly 14 includes a lower support frame 38 having a top surface 40 with a plurality of support members 42 extending from top surface 40. Lower support frame 38 also has a centrally positioned cable guide channel 44. Cable guide channel 44 has a first end 46 and a second end 48. A first roller assembly in the form of first pulley 50 is positioned at first end 46 and a second roller assembly in the form of second pulley 52 is positioned at second end 48. Upper support frame 16 is supported by support members 42 in parallel spaced relation to lower support frame 38. Upper support frame 16 has a top surface 56 and opposed sides 58 and 60; in addition to first end 20 and second end 22, previously described. A direction altering roller assembly in the form of direction altering pulley 62 is centrally mounted intermediate opposed sides 58 and 60 at second end 22 of upper support frame 16. A rotatably mounted roller 64 extends between opposed sides 58 and 60 at first end 20 of upper support frame 16. First end 24 of tow line 26 is positioned adjacent roller 64 at first end 20 of upper support frame 16. A cable sling 66 positioned at first end 24 of tow line 26 serves as means for attachment of tow line 26 to end 28 of skid assembly 30 of second trailer 32. Tow line 26 extends across upper support frame 16 from first end 20 to second end 22, over direction altering pulley 62 and down to second pulley 52 at second end 48 of cable guide channel 44. From there tow line 26 extends through cable guide channel 44 to first pulley 50 at first end 46 of cable guide channel 44. Second end 34 of tow line 26 has an eyelet 68 which serves as means for attachment to winch 36. Referring to FIG. 2a through 2d, winch 36 can be conveniently mounted at rear 70 of a flatbed trailer 72 used to transport second modular housing unit 32 to the drilling site. When winch 36 is activated a force is exerted upon tow line 26 to pull second modular housing unit 32 over roller 64 and along top surface 40 of upper support frame 16 from first end 20 to second end 22. Guide plates 74 are secured to opposed sides 58 and 60 of upper support frame 16. Guide plates 74 extend above top surface 56 of upper support frame 16 and serve as guide means for guiding the second modular housing unit 32 as it travels from first end 20 to the end 22 of upper support frame 16. Upstanding stop plates 76 are secured to top surface 40 of upper support frame 16 adjacent second end 20. Stop plates 76 serve as stop means to limit the extent to which second modular housing unit 32 can move along top surface 56 of upper support member 16 toward second end 22. Referring to FIGS. 3 and 4, there is illustrated second modular housing unit 32 in position stacked on first trailer 12 with the weight being borne by skid assembly 14, as described. Although not illustrated in FIG. 1, it is preferred that steps 80 be secured to skid assembly 14 adjacent second end 22 of upper support frame 16 to facilitate use of second modular housing unit 32, as illustrated in FIGS. 3 and 4.

It will be apparent to one skilled in the art that modifications may be made to the illustrated embodiment without departing from the spirit and scope of the invention as defined by the Claims. In particular, it will be appreciated that winch 36 need not be mounted at rear 70 of flatbed trailer 72; any truck mounted or fixed position winch may be used. It will also be appreciated that top surface 56 of upper support member 16 may require a plurality of cross-members to serve as reinforcement depending upon the weights of the modular housing unit and the strength of the materials used.

The embodiments of the invention in which an exclusive property or privilege is claimed are as follows:

1. A method for stacking modular housing units, comprising the steps of:

firstly, positioning a first modular housing unit on a skid assembly having an upper support frame that overlies a top of the first modular housing unit, the upper support frame having a first end and a second end;

secondly, securing a first end of a tow line to an end of a skid assembly for a second modular housing unit, extending the tow line over the upper support frame from the first end across to the second end and securing a second end of the tow line to a winch;

thirdly, activating the winch to raise the skid assembly of the second modular housing unit to the height of upper support frame and then draw the skid assembly of the second modular housing unit from the first end of the upper support frame across the upper support frame until the end of the skid assembly of the second modular housing unit to which the tow line is attached is positioned at the second end of the upper support frame.

2. A skid assembly, comprising:

a lower support frame having a top surface with a plurality of support members extending from the top surface;

an upper support frame supported by the support members in parallel spaced relation to the lower support frame, the upper support frame having a top surface, a first end, a second end and opposed sides;

a rotatably mounted roller extending between the opposed sides at the first end of the upper support frame; and the lower support frame having centrally positioned cable guide channel with a first roller assembly positioned at a first end, a second roller assembly positioned at a second end and a roller assembly centrally mounted intermediate the opposed sides at the second end of the upper support frame.

3. The skid assembly as defined in claim 2, wherein guide means are secured to the opposed sides of the upper support frame, the guide means extending above the top surface of the upper support frame.

4. The skid assembly as defined in claim 2, wherein stop means are secured to the top surface of the upper support frame adjacent the second end.

5. A skid assembly, comprising:

a lower support frame having a top surface with a plurality of support members extending from the top surface and a centrally positioned cable guide channel, the cable guide channel having a first roller assembly positioned at a first end and a second roller assembly positioned at a second end;

an upper support frame supported by the support members in parallel spaced relation to the lower support frame, the upper support frame having a top surface, a first end, a second end and opposed sides, a direction altering roller assembly being centrally mounted intermediate the opposed sides at the second end of the upper support frame; and a rot drably mounted roller extending between the opposed sides at the first end of the upper support frame;

a tow line having a first end and a second end, the first end being positioned adjacent the roller at the first end of the upper support frame and having attachment means, the tow line extending across the upper support frame from the first end to the second end, over the direction altering roller assembly and down to the second roller assembly at the second end of the cable guide channel, through the cable guide channel to the first roller assembly at the first end of the cable guide channel, the second end of the tow line having means for attachment to a winch, guide means secured to the opposed sides of the upper support frame, the guide means extending above the top surface of the upper support frame; and stop means secured to the top surface of the upper support frame adjacent the second end.

\* \* \* \* \*